United States Patent
Haller

[15] 3,637,489
[45] Jan. 25, 1972

[54] PROCESS FOR THE SEPARATION OF BLOOD COMPONENTS, PARTICULARLY OF IMMUNOLOGICALLY ACTIVE GLOBULINS FROM OTHER COMPONENTS

[72] Inventor: Wolfgang Haller, 5400 Pooks Hill Road Apt. 912, Bethesda, Md. 20014

[22] Filed: Feb. 12, 1970

[21] Appl. No.: 10,752

[30] Foreign Application Priority Data

Feb. 12, 1969    Germany..................P 19 07 014.5

[52] U.S. Cl. ...........................................................210/31 C
[51] Int. Cl........................................................B01d 15/08
[58] Field of Search ..............210/31, 198; 55/67, 197, 386; 73/23.1

[56] References Cited

UNITED STATES PATENTS

| | | | |
|---|---|---|---|
| 3,114,692 | 12/1963 | MacDonell | 210/31 X |
| 3,395,093 | 7/1968 | Liberti | 210/198 X |
| 3,455,817 | 7/1969 | Modell | 210/198 X |
| 3,492,396 | 1/1970 | Dalton et al. | 210/198 X |

Primary Examiner—Reuben Friedman
Assistant Examiner—Charles N. Hart
Attorney—Christen & Sabol

[57] ABSTRACT

A process for the separation of blood components, particularly of immunologically active globulins from other components, by steric chromatography, whereby plasma or serum, either in natural form or already coarsely prefractionated, is introduced into a chromatographic column which is filled with a porous auxiliary substance and is subsequently eluted from the chromatographic column with an aqueous solvent, the eluant emerging from the column being collected in fractions which may be further concentrated and/or purified. The porous auxiliary substance is a porous glass of a pore diameter of an average value of 100–250 A., said porous glass having been produced by heat treating, particulating, leaching with acid and base of the solidified product of melting together of $B_2O_3$, $SiO_2$ and RO, wherein R is an alkali metal, alkaline earth metal or heavy metal.

6 Claims, 1 Drawing Figure

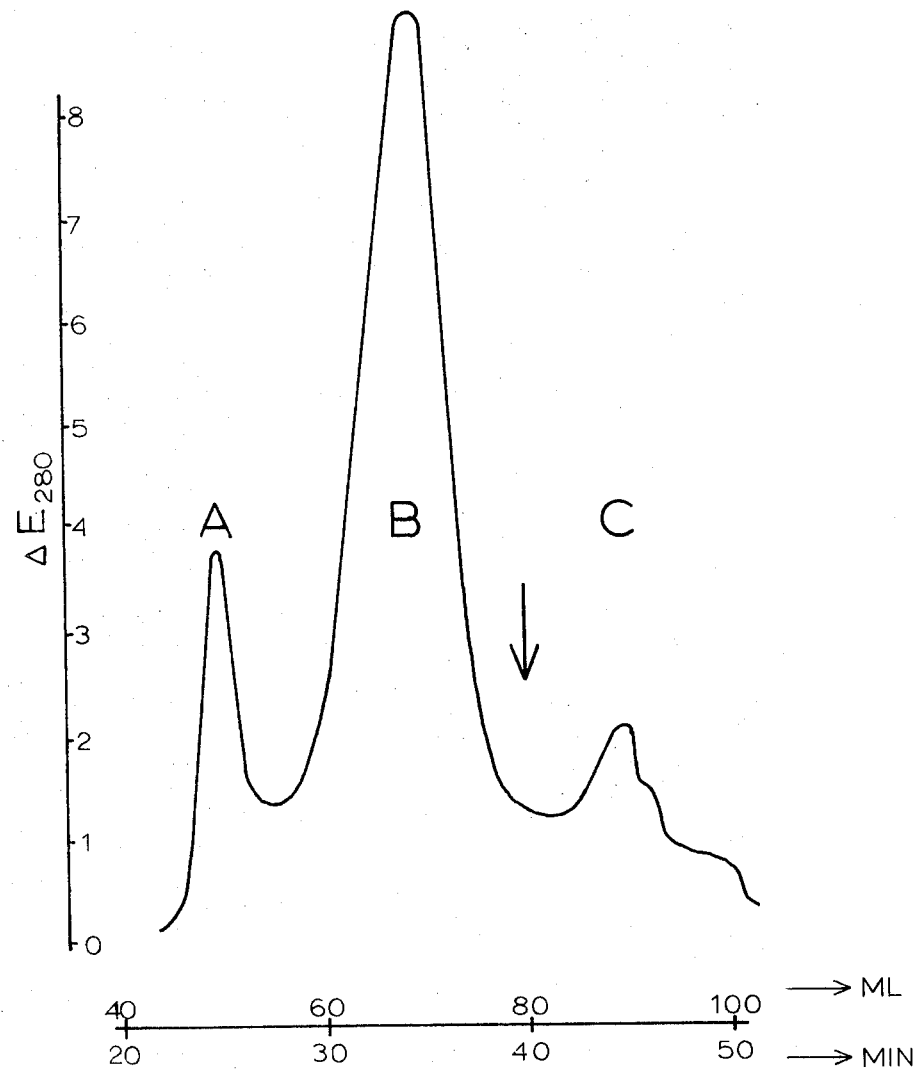

PROCESS FOR THE SEPARATION OF BLOOD COMPONENTS, PARTICULARLY OF IMMUNOLOGICALLY ACTIVE GLOBULINS FROM OTHER COMPONENTS

A nonexclusive license to make and use for governmental purposes the invention described herein has been granted to the United States Government.

The present invention relates to a process for the separation of blood components, particularly of immunological active globulines from other components by steric chromatography, whereby plasma or serum either in natural form or previously coarsely prefractionated is introduced into a chromatographic column which is filled with a porous auxiliary chromatographic medium and subsequently eluted from the chromatographic column with an aqueous solvent, the eluant emerging from the column being collected in fractions which may be further concentrated and/or further purified.

It is well known that serum proteins with immunological activity, the so-called immunoglobulins, are the most important natural defenses of the animal and human body against microbes and foreign cells such as bacteria and viruses. Such immunoglobulins are therefore of great medical importance since they can be used prophylactically or for the treatment of infectious disease. They are further important for the treatment of constitutional and of temporary lack of immunoglobulins. Temporary lack of certain immunoglobulins is a normal condition in newborn infants since the immunoglobulins of the mother have to reach the infant through the placenta and the placenta can only be permeated by low molecular weight immunoglobulins. The high molecular weight immunoglobulins which cannot reach the infant are the body's defense against certain bacterial infections. This explains the high susceptibility of infants to bacterial infections. Such infections are for instance caused by the ubiquitous microbes of the coligroup which live in the intestines of the mother. Such infections are today one of the major causes of infant mortality in countries with high standards of living.

There exist a number of ways to concentrate immunoglobulins and to treat with immunoglobulins. It is for instance possible to give endangered patients immunoglobulins by way of blood transfusions or through injection of blood serum. A disadvantage of this technique is the fact that the system of the patient is overloaded with a high infusion volume and with a large quantity of immunologically inactive proteins.

To overcome the last-mentioned disadvantages it has been attempted to fractionate blood serum to obtain fractions which are enriched with respect to the immunologically active proteins. The most prominent method is Cohn fractionation (see J. Amer. Chem. Soc. Vol. 68 (1,046) page 459) which is a precipitation method having the disadvantage of producing severe activity losses, particularly of M-immunoglobulins. The usual commercial gamma-globulin preparations are therefore quite active against many infections, particularly if they are of viral origin, but are not active against certain other infections of for instance bacterial origin.

There have been described other, relatively gentle separation methods for the fractionation of serum components. German Pat. No. 1,172,648 and U.S. Pat. No. 3,125,500 for instance describe a carrier-free continuous electrophoresis. This technique has inherent limitations with respect to possible throughput, since substantial amounts of electrical energy have to be converted to heat which cannot be removed from the solutions in any satisfactory way.

It is further known to separate serum proteins with the aid of gel filtration, also called gel chromatography, steric chromatography, exclusion chromatography or gel permeation chromatography. This method utilizes porous auxiliary substances which have pores of such dimensions that molecules to be separated diffuse into and out of the pores at different velocities or are prohibited from entering the pores. To perform the above-mentioned technique, the equipment used is similar to that used in classic adsorptive chromatography although the mechanism of separation differs fundamentally from the latter. The porous auxiliary substances used are usually gels such as cross-linked dextranes or polyacrylamid. Gels of this type are for instance the commercial "Sephadex" gel. They can be used to fractionate serum proteins on a laboratory research scale but cannot be used for large-scale fractionation and particularly if the products should qualify for medical applications.

One disadvantage of the gels is the fact that control of their pore size is accomplished by adjusting the concentrations of the monomer and cross-linking agents. As a result there is an interdependence of pore size with pore diameter. Gels with large pores, as are necessary for the separation of high molecular weight substances such as immunoglobulins, have high pore volume and are therefore soft and mechanically unstable. Gel particles in chromatographic beds deform therefore under the weight of the bed and under the hydraulic pressure of the eluant. As a result such beds have high flow resistance dependent on the flow rate and the material can be used only for relatively small chromatographic columns. This precludes large-scale production use.

Another disadvantage is the heat sensitivity of the gels. To be safe for clinical applications, all equipment which comes in contact with the serum proteins must be sterilized. Heat sterilization is considered as the safest technique of sterilization but cannot be applied to the above-described organic gels. Chemical sterilization is tedious and poses the risk that residuals of the sterilization agents remain in the equipment and contaminate the product. Another disadvantage of gels is their limited resistance to microbial spoilage. Accidental microbial spoilage produces dangerous substances. Gel columns which have been accidentally contaminated must be discarded. Caustic or oxidizing cleaning agents which would destroy the microbes or fungi also destroy the organic gels.

A further disadvantage of the gels is their broad pore size distribution spectrum which leads to a broad elution spectrum and limited resolution. In preparative, large-scale separations it is however of advantage to have good resolution and close control with respect to elution position of molecular species of given molecular weight and molecular shape.

It is the primary object of the present invention to provide a rapid, high-capacity process for the fractionation of blood components and particularly for the separation of highly sensitive, immunologically and antibacterially active immunoglobulin M (19 s) from other blood components.

It is another object of the present invention to provide a process which preserves the immunological activity of the proteins, can operate at high and constant levels of throughput and is adaptable to technical and commercial scale operation. It is a still further object of the present invention to provide a process which allows sterile, clinically safe operation.

Further objects and advantages of the present invention will best be understood by reference to the following specification taken in connection with the accompanying drawing wherein:

The FIGURE is a graph showing the optical absorption curve at 280 m$\mu$ of the eluant resulting from passing human serum through a chromatographic column according to the process of the present invention.

It has been surprisingly found that the above-cited objects can be attained by separating plasma or serum by steric chromatography through use of a specially prepared, inorganic, porous borosilicate glass of narrow, precisely controlled pore size.

The porous auxiliary substance of the present invention is a porous glass of a pore diameter of an average value of 100–250 A. as defined in "Nature" Volume 206, pages 693–696 and as determined by mercury intrusion as described by Winslow and Shapiro in ASTM Bull. Volume 39 (Feb. 1959) said porous glass having been produced by heat treating, particulating and leaching with acid and alkali the solidified product resulting from melting together $B_2O_3$, $SiO_2$ and RO, wherein R is an alkali metal, alkaline earth metal or heavy metal.

One preferred porous glass which has been prepared is described in the Journal of Chemical Physics, Volume 42, No. 2 (1965) pages 686–693. According to this description, $B_2O_3$, $SiO_2$ and RO, wherein R designates an alkali metal, alkaline earth metal or heavy metal such as $Na_2$, Zn or Pb, are melted in certain weight ratios to form a borosilicate glass. The resulting melt is cooled, subjected to a heat treatment, crushed and classified. Subsequently the microphase of the glass which is rich in boron is removed by an acid extraction and the silica-rich phase is leached with caustic solutions or hydrofluoric acid to remove deposited colloidal $SiO_2$.

A preferred porous medium for use in the present invention is prepared from a base glass having a composition which lies in a limited region of the ternary system $RO \cdot B_2O_3 \cdot SiO_2$ wherein said region comprises compositions which will separate by heat treatment into at least two phases, one of which is easily decomposable and the other substantially undecomposable. The term RO means any of the alkaline earth, alkali metal or heavy metal oxides wherein RO can be $Li_2O$, $Na_2O$, $K_2O$, CaO, BaO, MgO, BeO, SrO, ZnO or PbO, or any combination thereof. It has also been found that the silica can be replaced with, for instance, germanium ($GeO_2$). Advantageously, the base glass composition can, for instance, be of the type described in U.S. Pat. Nos. 2,106,744 and 2,215,039. It is important that the mixture of oxides chosen displays an immiscibility gap, i.e. that the melt of the oxides when above a predetermined temperature, is a substantially homogeneous liquid and, when below said predetermined temperature, segregates into at least two immiscible liquids. In addition to the mixture of oxides chosen displaying such an immiscibility gap, it is also important that the volume ratio of the phases be between 1:2 and 2:1, i.e., approximately equal and that the chemical durability of each phase differs substantially enough to permit selective leaching. Representative suitable mixtures of oxides include compositions wherein the base glass silica is present in amounts ranging from 50 to 83 weight percent, the RO, e.g. soda, potash, lithia, etc., is present in amounts ranging from about 2 to 10 weight percent and the boric oxide is present in amounts from about 8 to 48 weight percent.

The duration $t$, and the temperature $T$ of above-mentioned heat treatment determine the internal surface area $A$ of the porous glass as well as its mean pore diameter which is in reciprocal relation to the internal surface area. The mentioned parameters are interrelated according to the equation:

$$1/A^n = k \exp[(-m)/T]$$

wherein $n$, $k$ and $m$ are constants which are characteristic for a given glass composition. The $400°n$, $to$ and $m$ can be calculated in the known way using above K.) after the internal surface area or pore diameter have been measured for a number of, at first arbitrarily selected, heat treatments. After the constants have been determined for a given time composition, it is possible to predict exactly which length of heat treatment $t$ at what temperature $T$ will result in the porous glass of the desired internal surface area and respectively reciprocally related average pore diameter.

It has been found that generally the treatment can be effected at a temperature $T$ ranging from 400° to 950° C. (673° to 1,223° K.) for a period $t$ ranging from about 2 hours to 4 weeks although it will be recognized that the upper ranges of time and the lower ranges of temperature generally are limited only by practical considerations.

It should also be recognized that a pore size of desired distribution can be achieved by casting, melt spinning or flame blowing the mixture of oxides, the time and temperature relationship defined above being maintained in such physical manipulations.

The glass, after undergoing a heat treatment in accordance with the above equation, is cooled and, if desired, crushed or comminuted to a preselected size. In case that the shaping method employed produces a skin of changed composition on the article, it may be necessary to remove this skin by abrasion or etching. The cooled glass, be it reduced to a preselected discrete particle size or formed into any other desired shape, is then treated to retain at least one of the microphases with the concomitant removal of, substantially, the remaining microphases. Ordinarily, the silica-rich phase is retained while the silica-poor, or boron-rich phase is removed by leaching with an acid. It has been found that the rigid pores of the resulting silica-rich phase skeleton are substantially filled with colloidal silica which is a decomposition product of the removed microphase. After washing the rigid, porous skeleton in an aqueous solution, the skeleton is treated with a solvent for the colloidal silica, preferably, a dilute solution of hydrofluoric acid or sodium hydroxide, for a time sufficient to remove the colloidal silica without substantial attack of the skeleton itself. Ordinarily, the colloidal silica solvent treatment time will range from about 1 to 4 hours. Thereafter, the skeleton can be dried and the dried skeleton thus comprises a rigid matrix provided with a continuous system of intercommunicating pores substantially free of contaminants.

The following is an example of preparation of the preferred porous glass used in the present invention.

EXAMPLE I

An alkali borosilicate glass composition exhibiting an immiscibility gap as defined hereinbefore was produced by mixing in a ball mill analytical grade sodium carbonate, boric acid and ground quartz in a proportion equivalent to a $Na_2O$ to $B_2O_3$ to $SiO_2$ weight ratio of 6.9 to 25.7 to 67.4, respectively. The mixture was fused in an electric furnace at 1,200° C. until the major amount of $H_2O$ and $CO_2$ was expelled. The temperature was then elevated to 1,450° C. and maintained while stirring for 5 hours. The melt was chilled by pouring onto a cold steel plate. A chemical analysis of the glass gave 6.0% $Na_2O$, 25.6% $B_2O_3$ and 68.4% $SiO_2$, by weight.

Five samples of glass made in accordance with the above procedure were heat treated in an electric muffle furnace with thermocouple readout and proportional control. The treatment times and temperatures varied as indicated in table I, below.

The five samples of heat-treated glass were crushed into small pieces in a steel mortar and fractionated by screening on stainless steel screens. Unless otherwise indicated, fraction ranging in size between 0.03 and 0.015 of grain diameter (50–100 mesh U.S.S.–ASTM sieves) were retained for further processing.

The silica-poor phase in each of the five samples of glass was removed by contacting the fractionated glass particles with 3N HCl at 50° C. for a period of 6 hours. This contact also served to remove any iron contamination picked up from the mortar. The acid solution was decanted and the fractionated glass particles subjected to a second acid leaching treatment for a period of 18 hours. The ratio of original glass powder to acid was maintained, essentially, at 50 grams to 400 milliliters. After the acid leach treatment, the discrete particles of glass were washed with water until the supernatant liquid was neutral and free of visible colloidal silica. Inasmuch as the silica-poor phase also contains silica in addition to water-soluble sodium borate, this silica is precipitated during the leaching process with the greater part thereof remaining in the pores of the silica-rich particles. To remove the colloidal silica precipitate from the pores of the silica-rich particles and thus provide an effective porous medium, the particles are contacted with a solvent for the colloidal silica. The particles were contacted with a 0.5N NaOH solution at 25° C. for 2 hours. Thereafter, the glass particles were washed with water until neutral, stirred with cold 3N HCl for 2 hours and extracted with cold water for 20 hours. The essentially colloidal silica-free particles were than washed with boiling water for 4.5 hours in an extractor and vacuum dried at 100° C. for 24 hours.

Subsequently, mercury intrusion pore size measurements were determined and calculated according to the method described in ASTM Bull, 39 (Feb. 1959) by N. M. Winslow and J. J. Shapiro.

| sample | Temp (°C.) | Time (hrs.) | Appearance glass block 1 cm. thick | Pore Size A |
|---|---|---|---|---|
| 1 | 564 | 4 | Transparent | 125 |
| 2 | 564 | 8 | Transparent | 150 |
| 3 | 564 | 16 | Transparent | 200 |
| 4 | 600 | 4 | Transparent | 175 |
| 5 | 600 | 8 | Transparent | 250 |

In the described way it is possible to produce porous glass of precisely predetermined pore diameter and of very narrow pore size distribution which possess numerous advantages over gels as porous auxiliary substances in steric chromatography. Such inorganic porous glasses are chemically inert, can be sterilized by heat and can be cleaned with strong acids such as for instance hot nitric acid or with diluted alkaline solutions and/or with oxidizing cleaning agents. Furthermore, columns made from this material allow high and completely constant eluant flow rates and produce therefore reproducible separation results at high throughput in large scale operations.

It has been found, as previously mentioned, that for the particular process, porous glasses of an average pore diameter from 100 to 250 A. are of particular advantage. The pore diameter of the glass can for instance be determined by statistical evaluation of electron microscopic photographs. Also of value is the already mentioned mercury intrusion method as described in ASTM Bulletin Volume 39, Feb. 1959. The given preferable pore diameters are based upon the latter method, whereby the average pore diameter is defined as has been described in "Nature" Volume 206, pages 693–696 (1965).

The following example illustrates use of porous glass particles in the process of the present invention and may be considered the best mode thereof.

EXAMPLE II

A chromatographic column of 100 cm. length and 1.1 cm. inner diameter was filled with particles of a porous glass of 175 A. average pore diameter. The particles had a size of between 0.149 mm. and 0.074 mm. (100- to 200-mesh screen size ASTM). The porous glass was prepared in accordance with example I from a glass consisting by weight of 6.9% $Na_2O$, 25.7% $B_2O_3$ and 67.4% $SiO_2$. The pore volume of the used glass was 0.77 ml./gram. The column contained 61 grams porous glass (dry weight). A flow of a buffer solution was then established through the column. A peristaltic pump maintained the flow at 2 ml. per minute. The buffer solution consisted of an aqueous solution of 0.05 mol Tris (hydroxymethyl) aminomethan and 0.1 mol NaCl per liter. Its pH was adjusted to a value of 9 with HCl. After some initial flushing with the buffer solution, portions of each 3 ml. of human serum were introduced into the head of the column in periods of 40 minutes. The average protein content of the serum was 8.25 percent as determined by the Lowry method described by Bartley E.T. and Poulik M.D. on pages 383–387 in "Automation in Analysis. Technikon Symposium," Volume 1 (1966, New York). Between the applications of the serum the column was eluted with the described buffer solution, the eluant was collected in fractions and its optical absorption at 280 mµ was measured.

Operated in the described way, the fractionation capacity of the 1.1×100 cm. column was approximately 100 ml. raw serum per 24 hours. The optical absorption curves at 280 mµ were identical for all periodic serum injections. The separation curve obtained from the first injection is shown in FIG. 1. The next introduction of a serum sample is indicated by the arrow in the FIGURE. Identical fractions indicated with A, B and C were pooled for all introduced serum portions.

The combined fractions A, B, and C were tested by way of well-known electrophoretic and immunological methods. It was found that fraction A contained immunoglobulin M (19 s), the $\alpha_2$-macroglobulin and immunoglobulin G (7s). Fraction A was free of albumin. The protein content was 0.4 percent. The passive hemaglutination titer (see Bact. Rev. 20, pages 166–188, 1965) of fraction A for colibacteria adsorbed on erythrocites was about one-quarter of the initial serum. The fraction B contained albumin, immunoglobulin G (7s) and transferin and was free of immunoglobulin M (19s) and from macroglobulin. Fraction C contained some albumin and a large amount of transferin.

In order to obtain a preparation more concentrated in immunoglobulin M (19s) the pooled fractions A were concentrated to one-fourth of their original volume by ultrafiltration through a "Visking" membrane against a buffer solution of the same composition as above described at a pressure differential of 1 atm. The concentrated fraction A had a heamaglutination titer which was equal to the one of the original serum but at a protein content of only 1.6 percent compared with 8.25 percent of the original raw serum. This constitutes a fivefold enrichment in immunological activity.

What is claimed is:

1. In a process for the separation of blood components by steric chromatography wherein plasma, prefractionated plasma, serum, or prefractionated serum is introduced into a chromatographic column filled with a porous auxiliary substance, is eluted from the chromatographic column with an aqueous solvent and the eluant emerging from the column is collected in fractions, the improvement which comprises using as said porous auxiliary substance a porous glass having an average pore diameter of 100–250 A. as determined by mercury intrusion, said porous glass having been produced by heat treating, comminuting and leaching with acid and alkali the solidified product of melting together $B_2O_3$, $SiO_2$ and RO, wherein R is an alkali metal, alkaline earth metal or heavy metal.

2. The process according to claim 1 wherein the heat treatment is according to the formula:

$$1/A^n t = k \exp[(-m)/T]$$

wherein $A$ is the internal surface area of the porous glass, $t$ is the duration in hours of the heat treatment, $T$ is the temperature of the heat treatment (°K.) and $n$, $k$ and $m$ are constants.

3. The process according to claim 1 wherein the heat-treated glass is comminuted to a size between 50 and 100 mesh.

4. The process according to claim 1 wherein the melt contains from 50 to 83 weight percent $SiO_2$, from 2 to 10 weight percent RO and from 8 to 48 weight percent $B_2O_3$.

5. The process according to claim 1 wherein R is selected from Li, Na, K, Ca, Ba, Mg, Be, Sr, Zn, Pb and mixtures thereof.

6. The process according to claim 1 wherein the porous glass is prepared from a glass consisting of 6.9 weight percent $Na_2O$, 25.7 weight percent $B_2O_3$ and 67.4 weight percent $SiO_2$.

* * * * *